United States Patent [19]

Klanner et al.

[11] Patent Number: 4,687,255

[45] Date of Patent: Aug. 18, 1987

[54] ADJUSTABLE TODDLER CAR SEAT

[75] Inventors: Wilfried Klanner, Starnberg; Dieter H. Schmaler, Olching; Hermann Wetter, Ulm/Donau; Bernhard Felsch, Münsind; Waldemar Czernakowski, Blaustein, all of Fed. Rep. of Germany

[73] Assignees: Romer-Britax Autogurte GmbH, Ulm/Donau; ADAC E.V., Munich, both of Fed. Rep. of Germany

[21] Appl. No.: 828,013

[22] Filed: Feb. 10, 1986

[30] Foreign Application Priority Data

Feb. 9, 1985 [EP] European Pat. Off. ......... 85101397.7

[51] Int. Cl.4 .......................... B60N 1/12; B60R 22/10
[52] U.S. Cl. .................................... 297/488; 297/216; 297/250
[58] Field of Search ............... 297/115, 250, 411, 416, 297/487, 488

[56] References Cited

U.S. PATENT DOCUMENTS

| 7,687 | 5/1877 | Morrison | 297/411 X |
| 4,176,878 | 12/1979 | Koutsky | 297/411 X |
| 4,239,282 | 12/1980 | White | 297/411 X |
| 4,568,122 | 2/1986 | Kain | 297/216 X |
| 4,580,842 | 4/1986 | Segal | 297/488 |

FOREIGN PATENT DOCUMENTS 3,019,153 12/1981 Fed. Rep. of Germany .

Primary Examiner—Kenneth J. Dorner
Assistant Examiner—Peter R. Brown
Attorney, Agent, or Firm—Karl F. Ross; Herbert Dubno

[57] ABSTRACT

A toddler seat has a base adapted to sit on the seat part in rearward engagement with the back part, having an upwardly directed seat surface on which a toddler can sit, and provided below the surface with a pair of opposite sides laterally flanking the surface and extending vertically and in the travel direction. Respective guides on the sides extend obliquely upward and forward thereon. Respective arms have lower ends at the guides upper ends above and flanking the seat surface, the belt normally passing around the upper ends of the arms. Respective complementary and interengaging formations at the lower ends and guides allow the arms to slide along the guides without pivoting so that the relative angular positions of the upper and lower arm ends do not change as the arms slide along the guides. The lower arm ends on the guides can be fixed at any of a plurality of positions offset along the respective guides so that the position of the upper arm ends relative to the seat surface can be adjusted vertically and in the travel direction. Thus the arrangement of this invention can be adjusted for a child of any size and can be easily readjusted as the child grows, but once adjusted the adjustment remains and does not need to be redone each time the child is loaded into or taken out of the seat. The guides of the arms ensure that the vehicular seat passes safely around the child so that even a small child can be held by a belt dimensioned for an adult.

13 Claims, 11 Drawing Figures

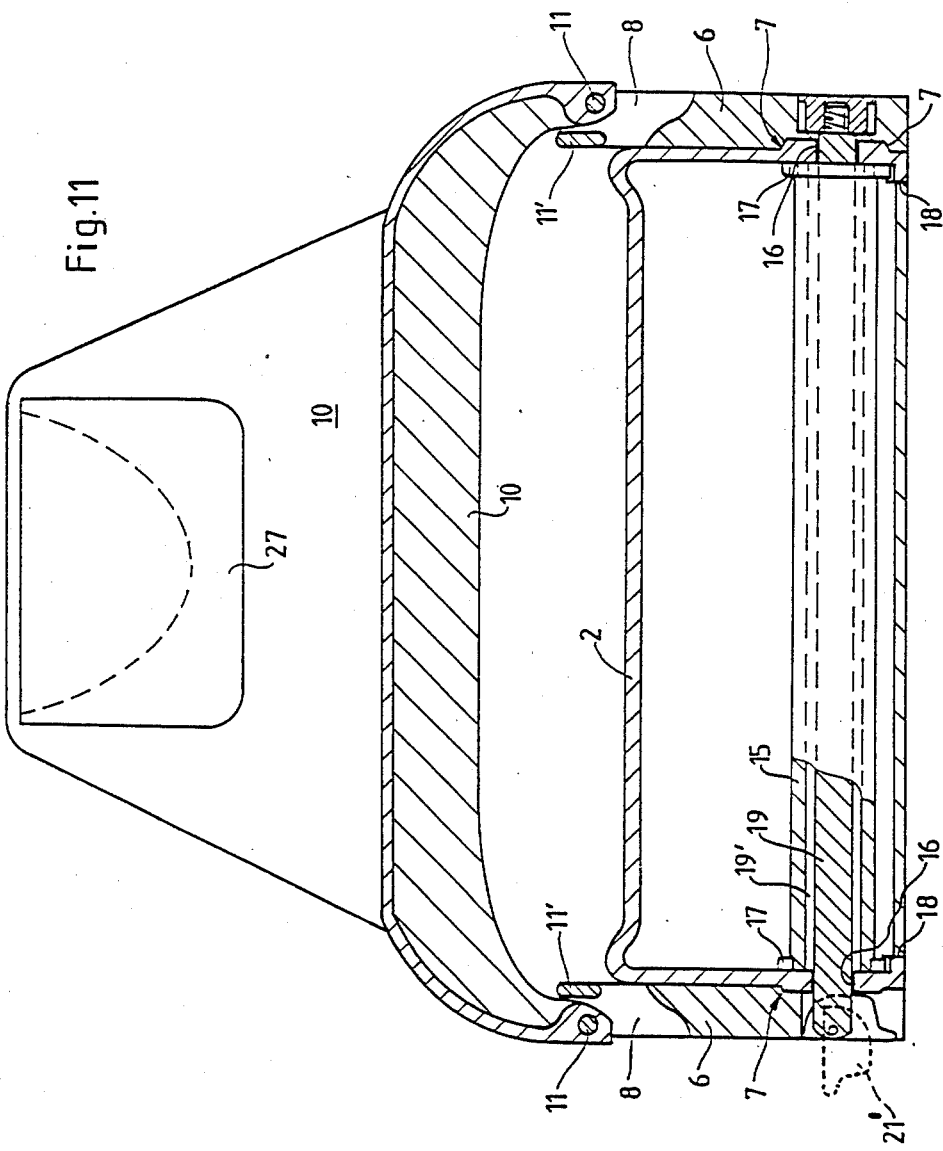

ADJUSTABLE TODDLER CAR SEAT

FIELD OF THE INVENTION

The present invention relates to a toddler car seat. More particularly this invention concerns such a seat which uses and/or is held in place by the existing vehicular seat belt.

BACKGROUND OF THE INVENTION

A car seat for a toddler, that is an infant capable of holding his or her head up, normally rests on a vehicle seat with the child facing forward. In a standard such arrangement the vehicular seat belt, which has ends fastened, relative to the forward travel direction, below and behind the vehicle seat, is used to secure the toddler seat in place on the car seat and to secure the child in the seat.

Seats of the Kolcraft TM, Hi-Rider TM, Quikstep TM, Commander TM, and Voyager TM type have a base which sits atop the vehicle seat and a pair of sides or arms that flank the child's pelvis. A shield member is either pivoted at the front of the base between the child's legs or at one of the sides and overlies the base atop the arms, confining the child in the seat. The belt is closed over this shield member to hold the toddler seat on the vehicle seat and to hold the shield member down atop the sides. Such an arrangement has the disadvantage that it cannot be adjusted for infants of different sizes so that small children are loosely confined in the device while large children are too tightly confined. Furthermore, such systems cannot be used without the shield member, as would be convenient with larger children.

In German patent document No. 3,019,153 filed May 20, 1980 by H. Engelhardt a head support is provided which is usable with a pivotal arm rest to form a toddler seat. The head support is downwardly and rearwardly U-shaped and is provided with a pair of downwardly projecting mounting pins that can fit either in a pair of holes in the top of the seat back for use as a head rest or in any two holes of two rows of holes formed in the top of the pivoted-down arm rest. The pins have vertically offset notches that can coact with catches in the arm rest to allow the vertical position of the device to be adjusted. Although such an arrangement does provide for adjustment both in the travel direction and vertically, it requires that the positions be set each time the child is loaded into the seat, that is the arm rest must be pivoted down, the child positioned on it, the pins inserted in the right holes, the device pushed down to the desired height, and the seat belt looped around it. Obviously this is a fairly onerous procedure which discourages use of the appliance. Furthermore the device is not very solidly anchored, so that it can work loose, particularly when worn, and can come violently apart in a crash.

A simpler system is described in European patent application No. 83,400,943-A1. Here the device is basically formed as a miniseat that sits atop the vehicle seat. The existing seat belt is threaded through guide passages in the arms of this seat and itself serves to hold the child in place. Basically all this device does is elevate the child. The disadvantage of such an arrangement is that it is not usable when the latch of the belt is too high so that it cannot be threaded through the guides, and it also can only accommodate fairly large children.

OBJECTS OF THE INVENTION

It is therefore an object of the present invention to provide an improved toddler seat.

Another object is the provision of such a toddler seat which overcomes the above-given disadvantages, that is which can be adjusted for children of different sizes, that can be used with or without a shield member, and that is very easy to load a child into.

SUMMARY OF THE INVENTION

The toddler seat of this invention has a base adapted to sit on the seat part in rearward engagement with the back part, having an upwardly directed seat surface on which a toddler can sit, and provided below the surface with a pair of opposite sides laterally flanking the surface and extending vertically and in the travel direction. Respective guides on the sides extend obliquely upward and forward thereon. Respective arms have lower ends at the guides upper ends above and flanking the seat surface, the belt normally passing around the upper ends of the arms. Respective complementary and interengaging formations at the lower ends and guides allow the arms to slide along the guides without pivoting so that the relative angular positions of the upper and lower arm ends do not change as the arms slide along the guides. The lower arm ends on the guides can be fixed at any of a plurality of positions offset along the respective guides so that the position of the upper arm ends relative to the seat surface can be adjusted vertically and in the travel direction. Thus the arrangement of this invention can be adjusted for a child of any size and can be easily readjusted as the child grows, but once adjusted the adjustment remains and does not need to be redone each time the child is placed in or taken out of the seat. The guides of the arms ensure that the vehicular seat belt passes safely around the child so that even a small child can be held by a belt dimensioned for an adult.

According to another feature of this invention each arm upper end is formed with a horizontally and forwardly open and upwardly and backwardly closed guide mouth through which the belt extends. This allows the toddler seat of this invention to be used for fairly large children, that is children who are too large for a conventional baby seat, but who are too small to sit directly on the seat encased by the adult-size belt.

For smaller children the invention uses a stiff shield having one end pivoted on one of the arm ends and another end fittable with the other arm end, the belt normally passing over the shield. In this case the upper arm ends are generally horizontal pins projecting forward in the travel direction and upwardly delimiting and defining the respective guide mouths. Means such as pins that can be removed without tools serve to releasably secure the shield to the one pin. Thus when the shield is in place the belt passes over it and when it is removed the belt passes under the pins and over the child on the seat surface. Normally the other shield end is formed with a seat complementarily receiving the respective pin. In fact the pin can fit in either end so the user can select which arm the shield should pivot on, as it is normally most convenient to pivot it on the inboard arm so that it is out of the way as the child is loaded into and taken out of the seat. More particularly according to the invention both shield ends are formed as normally downwardly open channels complementary to the respective pins and the means releasably securing the shield to the one pin is a bolt traversing the respective channel underneath the one pin.

For easiest operation according to this invention means is provided for linking the two lower arm ends together for joint and synchronous displacement along the respective guides. This means is constituted as a horizontal and transverse shaft having ends pivoted on the respective lower arm ends, respective similar gears fixed on the shaft ends, and respective racks on the base, meshing with the respective gears, and extending along the respective guides. In addition clamp means is provided for pressing the lower arm ends horizontally toward each other against the respective guides. More particularly, a core shaft defining an axis, extending horizontally and transversely through the base, and having one end bearing axially inward on the respective lower arm end and an other end provided with the clamp means bears axially oppositely inward on the respective lower arm end. A locking pawl pivotal about an axis transverse to the shaft axis can have an eccentric surface engaging inwardly parallel to the shaft axis with the base side. It is also possible to use a helical surface on the core shaft and a helical surface engageable therewith and on the respective side. One of these helical surfaces is rotatable relative to the other to work like an eccentric or nut with a coarse thread. A particularly advantageous combination has the core shaft passing through a tube constituting the shaft of the link means.

The guides of this invention are partly formed by respective horizontally and transversely going slots extending obliquely and having straight sides. The core shaft projects through the slots and has flats engaging the sides thereof. In addition the guides include complementary and interfitting grooves and ridges extending obliquely on the lower ends and sides.

In accordance with another feature of this invention the stiff shield can have a downwardly open belt clip through which the shoulder strap of a shoulder-type seat belt normally passes.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 11 is a large-scale section taken along line XI—XI of FIG. 10.

SPECIFIC DESCRIPTION

Figure 1:
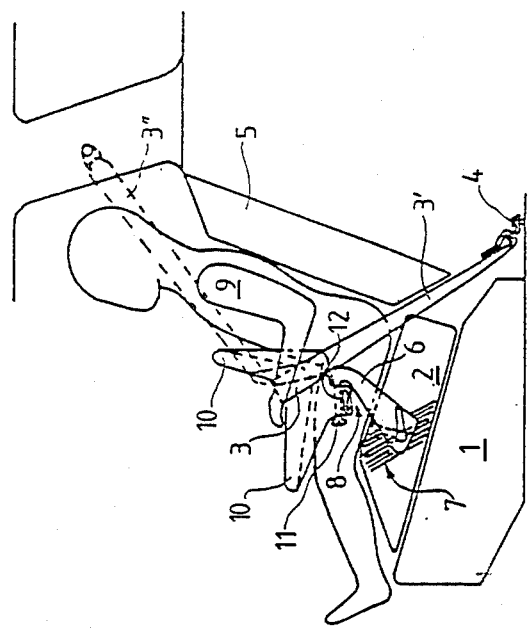
FIGS. 1 and 2 are small-scale front and side views illustrating the toddler seat according to this invention in use.
Figure 2:
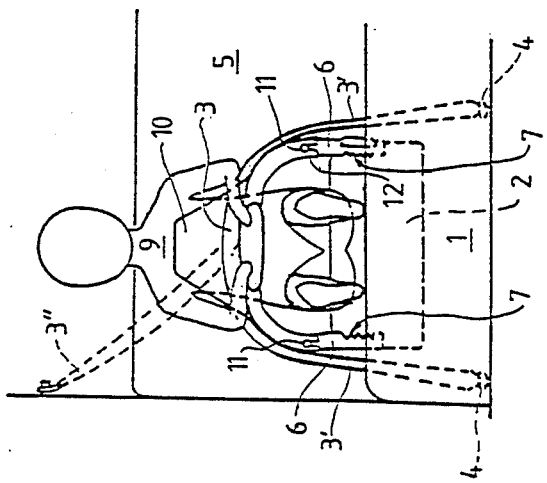

As seen in FIGS. 1 through 9 a toddler seat according to the invention is used on a motor-vehicle seat 1, 5 having a seat part 1 and a back part 5. A seat belt 3 has two ends 3' secured at points 4 below and behind the seat part 1 relative to a normal travel direction D (FIG. 4) of the vehicle, and may have a shoulder strap 3'' secured at 4' above and behind the seat back 5 on the window post of the vehicle.

The toddler seat itself basically comprises a base 2 that is located between the seat and back parts 1 and 5 and that defines a surface 2' for a child 9 to sit on. The sides 2'' of this base are formed with guides 7 extending at about 45° to the horizontal and in the travel direction D. Here the guides 7 are each formed as a two rows of parallel ridges and grooves separated by a horizontally and transversely throughgoing slot 16 that extends obliquely. Respective arms 6 have lower ends formed with ridges that interfit with the guides 7 and upper ends formed with horizontally forwardly projecting pins 11 defining respective guide mouths 8. As will be described in more detail below, these arms 6 can slide obliquely of the base 2 along these guides 7 to position these upper-end pins 11 both vertically relative to the surface 2' and horizontally relative to the base 2.

Figure 4:
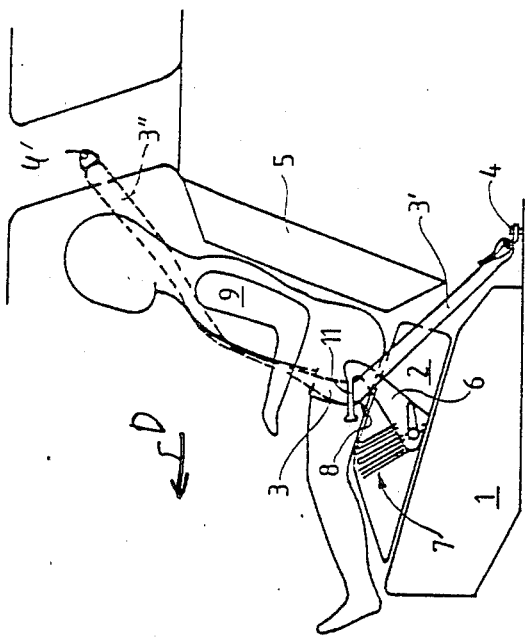
FIGS. 4 and 5 small-scale front and side views like respective FIGS. 1 and 2 but illustrating another method of using the toddler seat according to this invention.
Figure 5:
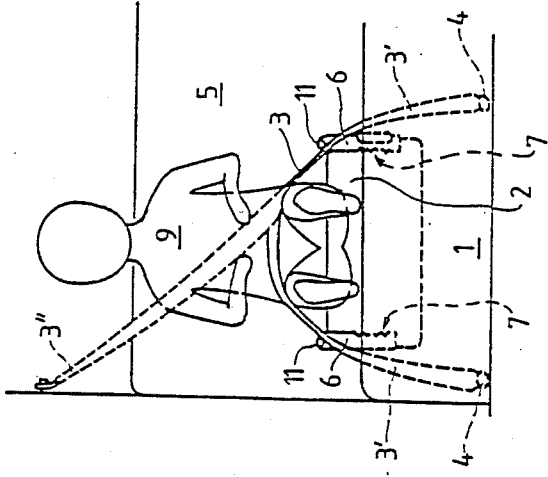
Figure 6:
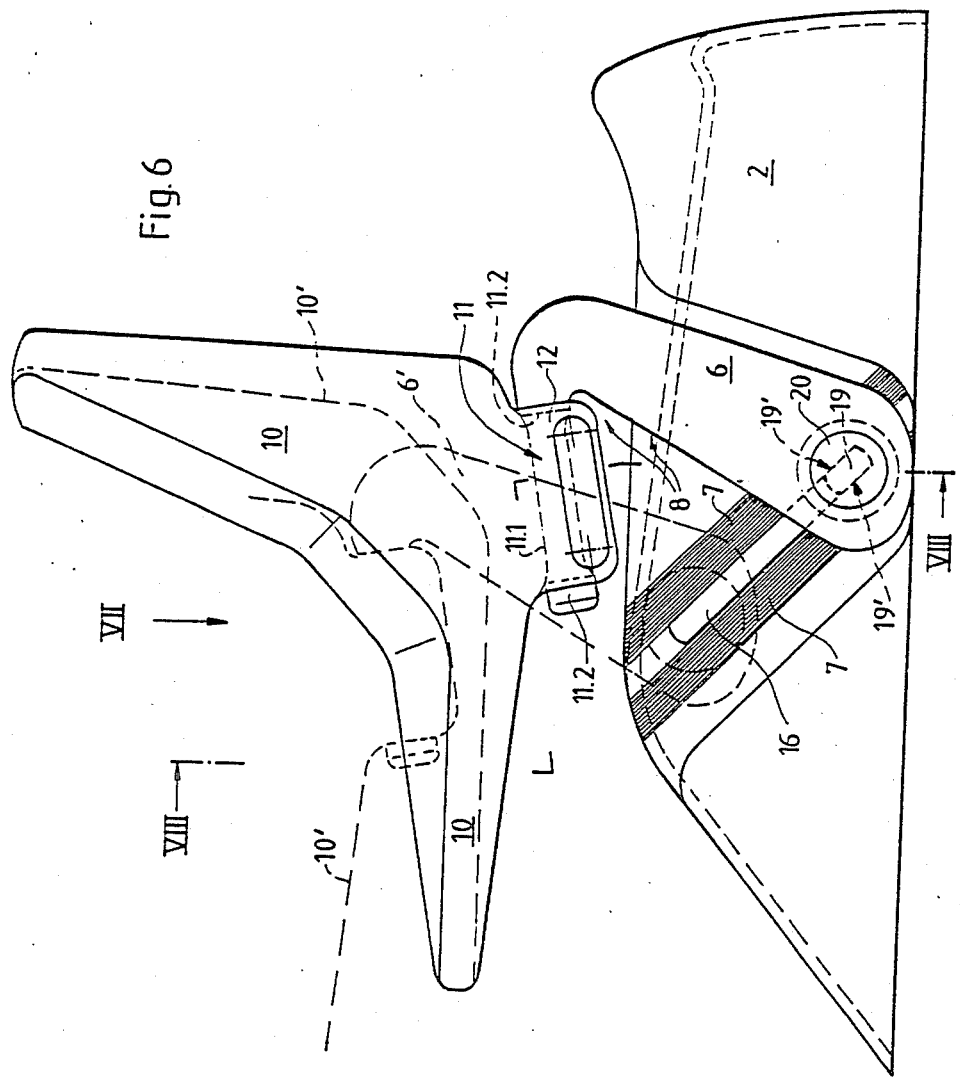
FIG. 6 is a side view in larger scale than FIGS. 1 through 5 of the toddler seat of FIGS. 1 through 5.
Figure 7:
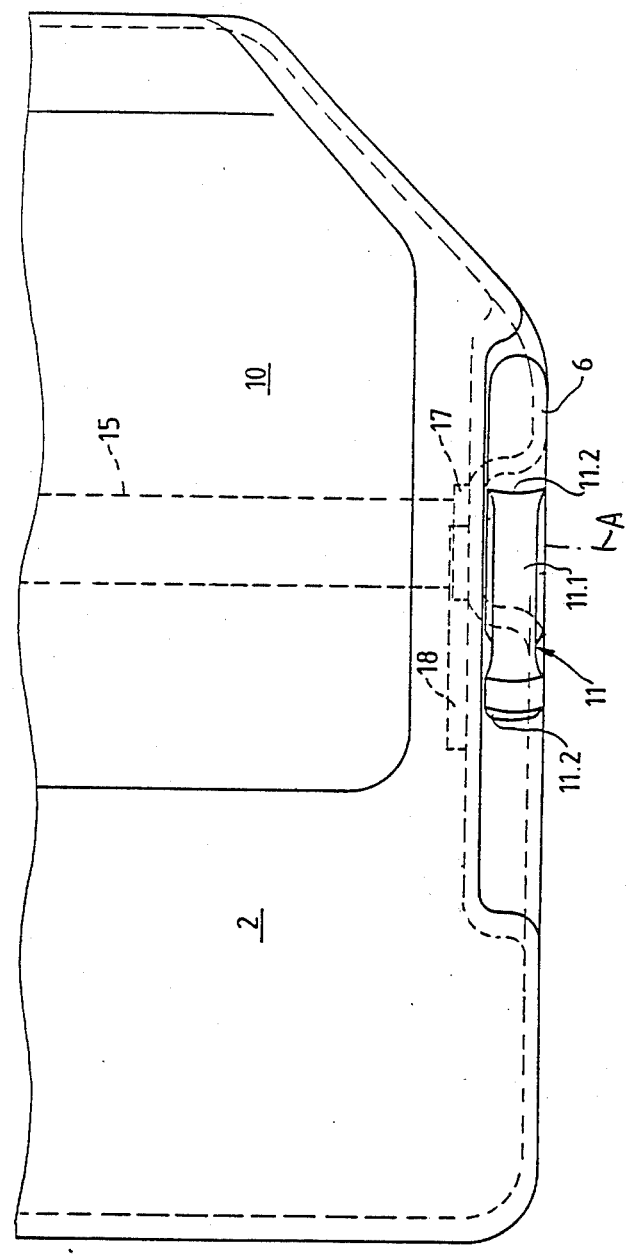
FIG. 7 is a top view taken in the direction of arrow VII of FIG. 6 of a detail of the seat.
Figure 8:
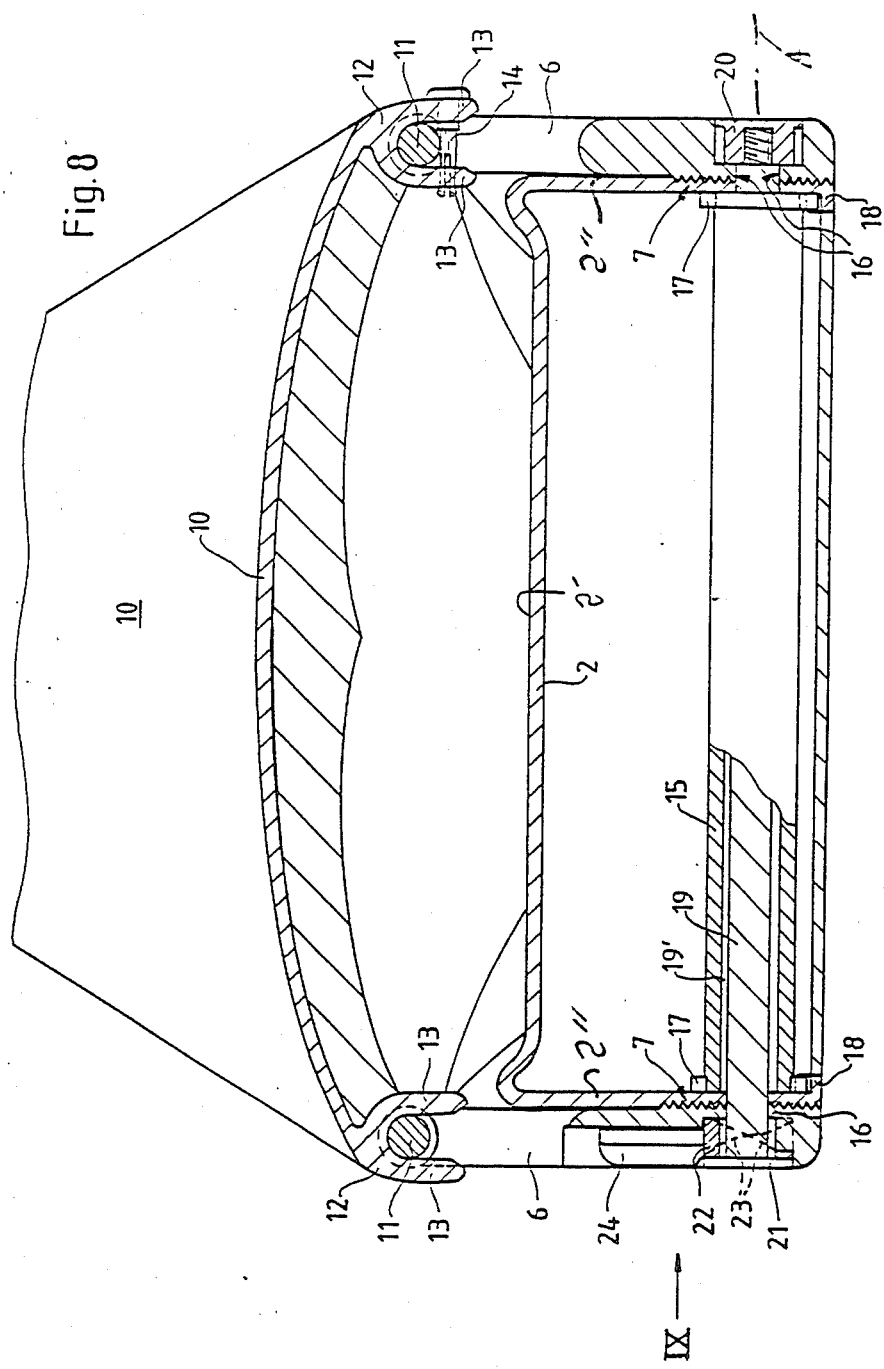
FIG. 8 is a vertical section taken along the broken plane indicated at VIII—VIII of FIG. 6.
Figure 9:
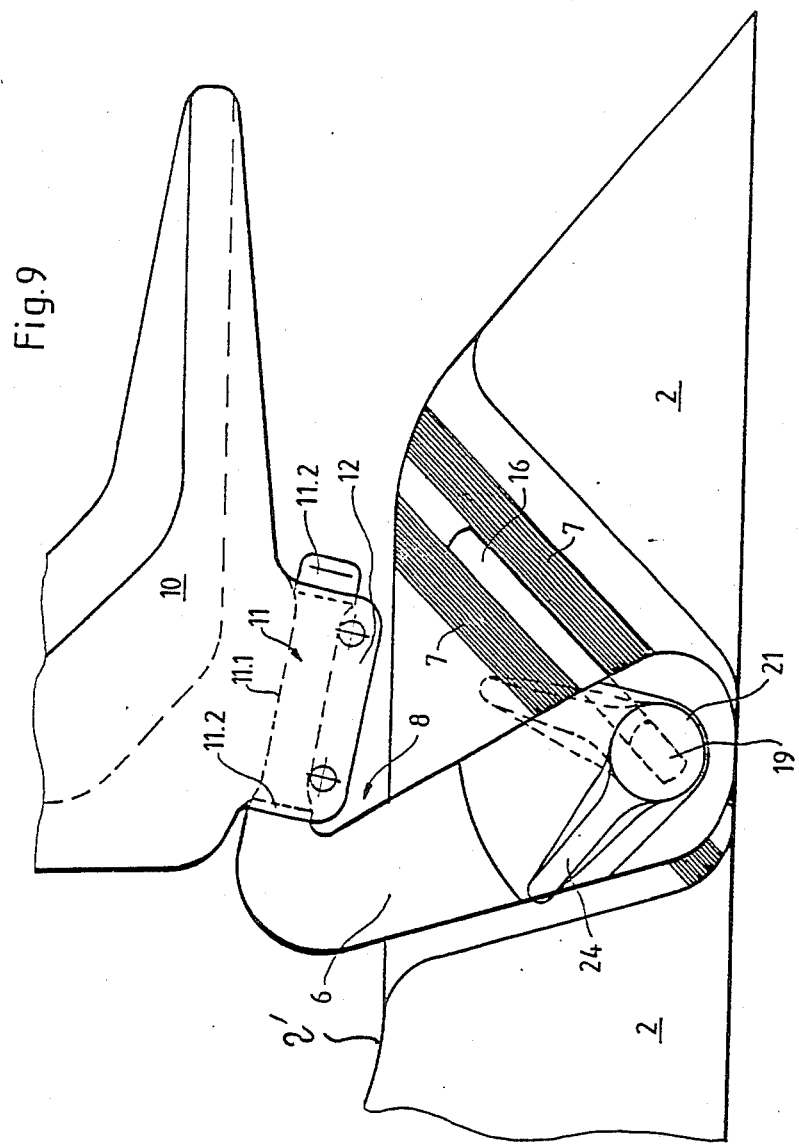
FIG. 9 is a side view like FIG. 6 but showing the lower portion of the seat of FIGS. 1 through 5 from the other side as indicated by arrow IX in FIG. 8.

As illustrated in FIGS. 4 and 5 a large child 2 sitting on the base 2 can be securely held thereon by the belt 3 when it passes through the mouths 8 under the pins 11. The toddler seat therefore serves to hold such a child up high enough that he or she can see out the window and over the front seat, while keeping the otherwise too wide belt 3 snugly engaged around and over him or her. Thus in this mode the toddler seat of this invention serves mainly as a booster seat, but as one that makes a seat belt dimensioned for an adult serve to hold the child safely.

For smaller children a stiff shield 10 is provided which has ends 12 that are formed as downwardly open channels 13 that fit over the pins 11. One of the channels 13 is transfixed below the respective pin 11 with removable bolts 14 that normally hold the shield thereon and that therefore serve to pivot the shield 10 on the mainly horizontal axis of this pin 11. To prevent the shield 10 from slipping forward and aft on the arrangement, the pins 11 are formed with a central cylindrical part 11.1 flanked by two larger-diameter parts 11.2. The bolts 14 can be used on either end 12 and are normally provided on the inboard pin 11, that is the pin 11 further from the closer vehicle door.

Figure 3:
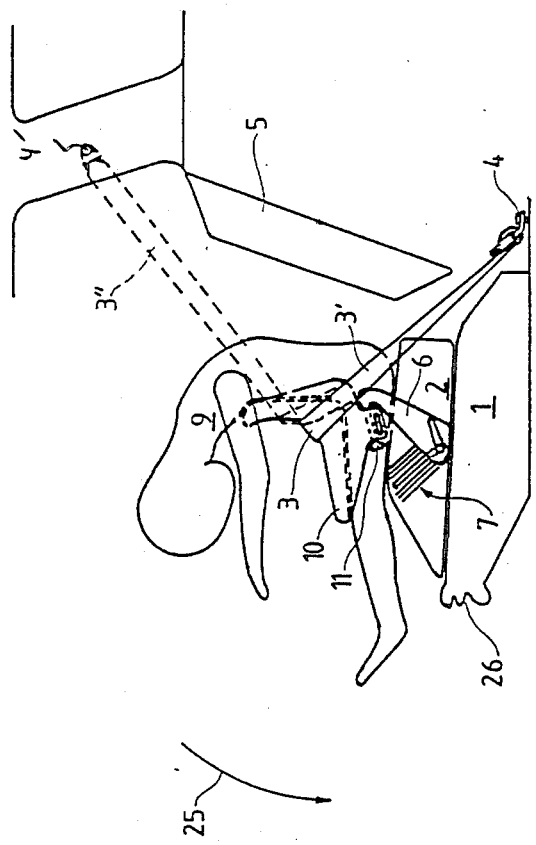
FIG. 3 is a view like FIG. 2 but with the various elements in the positions assumed in a sudden stop.

In a sudden stop or collision as seen in FIG. 3 the entire unit might pivot somewhat forward and down as illustrated by arrow 25, compressing the seat part 1 as shown at 26. The infant will be securely held, even if the force is sufficient to overcome the frictional engagement of the lower arm ends on the guides 7 and allow them to slip back down. Thus even if the force of a collision is so great as to overcome the force with which the adjustment of the arms 6 is locked in, this will occur in a manner that is in no way dangerous.

As best seen in FIGS. 6 through 9 the lower ends of the arms 6 are transversely and horizontally interconnected by a shaft 19 having flats 19' that ride on the straight sides of the slots 16 so that this shaft 19 cannot rotate about its horizontal transverse axis. At the one end the rod 19 is threaded into a nut 20 that can be rotated relative to the respective arm 6 for disassembly or calibration. The other end has an enlarged head 21 bearing axially inward on and rotationally fixed to an oblique washer 22 having an inclined surface 23 engaging against another such surface 23 of a lever 24. The inclination of the two generally helical or inclined surfaces 23 relative to each other is such that no more than 90° pivoting of the lever 24 relative to the shaft axis A is necessary to go between a locked position with the two arms 6 pressed axially tightly inwardly in their guides and a freed position in which the two arms 6 can slide along the respective guides 7.

Furthermore the shaft 19 is surrounded by a sleeve 15 having ends carrying gears 17 that bear axially outwardly against the sides 2" of the base 2 and that mesh with respective racks 18 formed integrally in the base 2 and extending along the respective slots 16. Thus when the arms 6 are loosened and one of them, normally the one with the lever 24, is pushed in either direction along the respective guide 7, the respective pinion 17 will roll along the respective rack 18 and will cause the opposite pinion 17 to roll along its rack 18 and identically position the other arm 6. This synchronous movement makes it extremely easy to adjust the seat according to this invention, and the simple lever-action locking makes it equally easy to secure the seat in any position once the right position is found.

Figure 10:
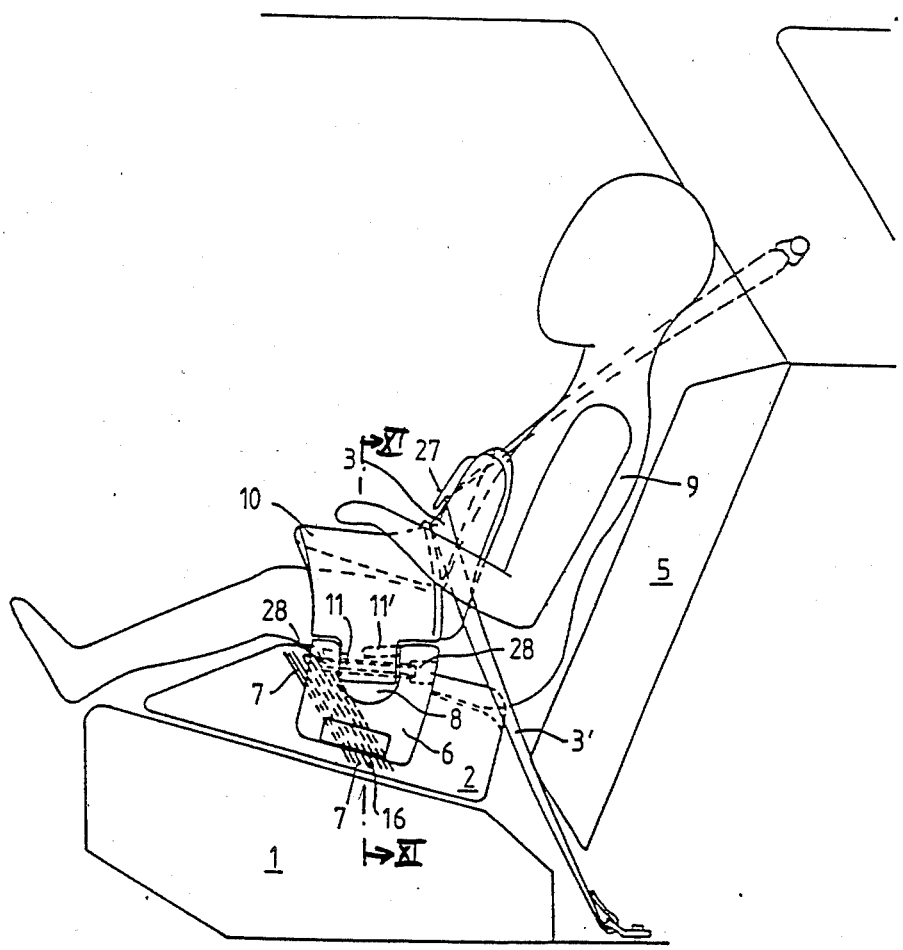
FIG. 10 is a side view like FIGS. 1 and 4 of another toddler seat according to this invention.

The arrangement of FIGS. 10 and 11 is similar, except that here the pins 11 are fixed in the shield 10 and the arms 6 are upwardly U-shaped, with forwardly projecting tabs 11' that form the mouths 8. The rods 11 are received in seats 28 in the arms 6, and the shield 10 is formed with a downwardly open retainer hook 27 under which the shoulder belt 3" is engaged. This arrangement also has a simple pivotal adjustment tab 21' that is pivoted about crosswise axis at the end of the rod 19 so that pivoting of it through 90° either clamps the sides 2" of the base 2 to the ends of the tube shaft 15 or releases them.

We claim:

1. A toddler seat for an automotive vehicle having a vehicle seat with a back, a seat surface extending forwardly from said back, and a seat belt anchored below said surface and adapted to extend upwardly and forwardly in a passenger-restraining position of the seat belt from points at which said seat belt is anchored on said vehicle, said toddler seat comprising:
    a base adapted to rest upon said surface and having a seating surface upon which a toddler can be seated with the back of the toddler resting against said back of the vehicle seat, said base having a pair of generally vertical sides extending downwardly from and flanking said seating surface of said base;
    respective upwardly and forwardly inclined guides formed on said sides of said base and oriented generally parallel to said seat belt in said passenger-restraining position thereof;
    a respective rigid arm having a lower end engaging and guided in each of said guides for movement therealong up and down generally parallel to said seat belt in said passenger-restraining position thereof, each of said arms having an upper end lying above said seating surface of said base and provided with a respective pin fixed in position on the respective arm extending generally in a direction of travel of the vehicle and below which said belt can pass around said toddler to retain said toddler on said base;
    locking means for frictionally securing each of said lower ends in position along the respective guides, said arms being constructed and arranged to maintain substantially fixed angular relationships with the respective guides in all possible selected positions of said lower end up and down along the respective guides; and
    a shield engageable by said pins with said arms and adapted to hold a toddler of small size in place on said base, said seat belt passing around said shield when said shield is engaged by said pins on said arms.

2. The toddler seat defined in claim 1 wherein each arm upper end is formed with a horizontally and forwardly open and upwardly and backwardly closed guide mouth defined by the respective pin and through which the seat belt extends.

3. The toddler seat defined in claim 1, further comprising
    means releasably securing the shield to of said pins, whereby when the shield is in place the belt passes over it and when it is removed the belt passes under the pins and over the child on the seat surface.

4. The toddler seat defined in claim 3 wherein one end of said shield is formed with a seat complementarily receiving a respective one of said pins and another opposite end of the shield is pivotally mounted on the other pin.

5. The toddler seat defined in claim 3 wherein both shield ends are formed as normally downwardly open channels complementary to the respective pins and the means releasably securing the shield to the pins is a bolt traversing the respective channel underneath one of said pins.

6. The toddler seat defined in claim 1, further comprising,
    link means linking the two lower arm ends together for joint and synchronous displacement along the respective guides.

7. The toddler seat defined in claim 6 wherein the link means comprises
    a horizontal and transverse shaft having ends pivoted on the respective lower arm ends;
    respective similar gears fixed on the shaft ends; and
    respective racks on the base, meshing with the respective gears, and extending along the respective guides.

8. The toddler seat defined in claim 1 wherein said clamp means is constructed to press the lower arm ends horizontally toward each other against the respective guides.

9. The toddler seat defined in claim 8 wherein said clamp means includes a core shaft defining an axis, extending horizontally and transversely through the base, and having one end bearing axially inward on the respective lower arm end and another end provided with means for bearing axially oppositely inwardly on the respective lower arm end.

10. The toddler seat defined in claim 9 wherein the clamp means includes a locking pawl pivotal about an axis transverse to the shaft axis and having an eccentric surface engaging inwardly parallel to the shaft axis with the base side 11. The toddler seat defined in claim 9 wherein the clamp means includes a helical surface on the core shaft and a helical surface engageable therewith and on the respective side, one of the helical surfaces being rotatable relative to the other.

12. The toddler seat defined in claim 9, further comprising link means for interconnecting the two lower arm ends together for joint and synchronous displacement along the respective guides, the link means comprising:
- a horizontal and transverse tube shaft having ends pivoted on the respective lower arm ends and coaxially surrounding the core shaft;
- respective similar gears fixed on the shaft ends; and
- respective racks on the base, meshing with the respective gears, and extending along the respective guides.

13. The toddler seat defined in claim 9 wherein the guides are partly formed by respective horizontally and transversely going slots extending obliquely and having straight sides, the core shaft projecting through the slots and having flats engaging the sides thereof.

* * * * *